United States Patent Office 3,523,984
Patented Aug. 11, 1970

3,523,984
POLYVINYL CHLORIDE PLASTISOLS CONTAINING TRIGLYCIDYL ISOCYANURATES
Wilhelm Clas, Duisburg-Meiderich, and Gerhard Gierenz, Solingen-Wald, Germany, assignors to Henkel & Cie, G.m.b.H., Dusseldorf-Holthausen, Germany, a corporation of Germany
No Drawing. Filed Apr. 23, 1968, Ser. No. 723,558
Claims priority, application Germany, May 11, 1967, H 62,709
Int. Cl. C08g 45/04
U.S. Cl. 260—836        6 Claims

ABSTRACT OF THE DISCLOSURE

A plastisol based on polyvinylchloride or mixed polymerizates with vinyl chloride, said polymers capable of forming a paste, with a content of an organic compound having more than one epoxide group in the molecule and an epoxide resin hardener characterized in that said organic compound having more than one epoxide group in the molecule is a glycidyl isocyanurate.

THE PRIOR ART

Plastisols prepared on the basis of polyvinyl chloride with a content of so-called epoxide resins and of hardeners for such epoxide resins are already known. These additions serve to improve the adhesion of the gelatinized plastisols to the widest possible active substances. However, such mixtures show several disadvantages. Namely, if the usual amine hardeners are used, the plastisol has only a limited shelf time; but, if instead, the so-called hot-hardeners are used, then the temperatures, required for the hardening process and for a satisfactory adhesion to the base, are relatively high. In addition to the usual epoxide resins, specific reactive glycidyl compounds, such as diglycidylaniline can be added to the plastisols. But even these plastisols, prepared according to the described method, exhibit a short shelf life only, because they become rapidly gelatinized without an external heat supply.

OBJECTS OF THE INVENTION

An object of the invention is to obtain adhering agents for plastisols based on polyvinylchloride or mixed polymerizates with vinyl chloride, which, on the one hand, will not change the storage stability of the plastisols to any unfavorable extent and which, on the other hand, effect a satisfactory adhesion already at relatively low temperatures after only a brief period of time.

Another object of the invention is the obtention of a plastisol based on polymers capable of forming a paste selected from the group consisting of polyvinylchloride and mixed polymerizates of vinyl chloride and monomers copolymerizable therewith, said plastisol having a content of a glycidyl isocyanurate having more than one epoxide group in the molecule and an organic epoxide resin hardening agent.

These and other objects of the invention will become more apparent as the description thereof proceeds.

DESCRIPTION OF THE INVENTION

According to the invention, these objects have been achieved by plastisols containing as the organic compound having more than one epoxide group in the molecule, a glycidyl isocyanurate. For this purpose the crystalline triglycidyl isocyanurate containing at least 14% of epoxide oxygen is preferably used.

The resinous as well as crystallized glycidyl isocyanurate relates to epoxide compounds prepared in known manner. The technical, crystalline triglycidyl isocyanurate has a high and a low melting form. Commercial products usually show a content of even more than 15% of epoxide oxygen. The preparation of crystalline triglycidyl isocyanurate having an epoxide oxygen content of at least 14% is described, for example, in U.S. Pat. No. 3,337,509, dated Aug. 22, 1967.

The content of triglycidyl isocyanurate should be selected so that about 1% to 20% by weight, preferably about 4% to 12% by weight are allotted to the total weight of the plastisol.

All of the known types of polyvinylchloride capable of forming a paste are suitable. The polymers based on polyvinylchloride used in the plastisols should have a K-value of about 50 to 80. Other suitable types of polymers based on polyvinylchloride usable in the plastisol are the mixed polymerizates capable of forming a paste, of vinyl chloride with, for example, vinylidene chloride or acrylic acid or methacrylic acid esters, with vinyl acetate or vinyl propionate or with vinyl esters of higher fatty acids. Moreover, small amounts of unsaturated carboxylic acids, or their anhydrides can be used for the preparation of the mixed polymerizates of vinyl chloride capable of forming a paste. As suitable unsaturated carboxylic acids are considered, for example, acrylic acid, methacrylic acid, crotonic acid, maleic acid, itaconic acid, fumaric acid and the like.

The plastisols of the invention contain the customarily utilized softening or plasticizing agents. For this purpose, for example, the esters of phthalic acid, particularly the alkyl esters and cycloalkylalkyl esters, such as dibutyl phthalate, dimethylcyclohexyl phthalate, dioctyl phthalate, didecyl phthalate or esters of phthalic acid admixed with the named alcohols such as octyl-decyl phthalate, may be considered, also alkyl sulfonic acid esters of aromatic compounds particularly phenols such as the octadecyl sulfonic acid ester of cresol or phenol. In addition, alkyl phosphoric acid esters are suitable such as tricresyl phosphate or adipic or sebacic acid esters of alkanols with medium chain length such as butanol, octanol or decanol.

Furthermore, the plastisols of the invention contain epoxide resin hardeners capable of hardening epoxide compounds. These are usually substances which are capable of forming polyadducts with epoxide compounds or to start a ring opening polymerization. Preferably, so-called heat hardeners, for example, carboxylic acid anhydrides or specific nitrogen compounds which contain hydrogen atoms bonded at least actively to nitrogen, are employed. These so-called heat hardeners are solids at ambient temperatures.

Anhydrides of organic polycarboxylic acids can be used as carboxylic acid anhydrides, for example, phthalic acid anhydride, tetrahydrophthalic acid anhydride, methylcyclohexanedicarboxylic acid anhydride, pyromellitic acid anhydride, endomethylenetetrahydrophthalic acid anhydride, methylendomethylenetetrahydrophthalic acid anhydride, tetrachloro and tetrabromophthalic acid anhydride, hexachloroendomethylenetetrahydrophthalic acid anhydride, dichloromaleic acid anhydride, dichloroadipic acid anhydride, etc., are considered for this purpose. The amount of the carboxylic acid anhydrides to be used shall be chosen so, that 0.6 to 1.2, preferably 0.8 to 0.9, carboxylic acid anhydride groups are allotted to each epoxide group.

As epoxide resin hardening agents, which contain at least two active hydrogen atoms bonded to a nitrogen atom, are the so-called heat hardeners. Dicyanodiamide, melamine, carbohydrazide, N-monoallylmelamine or N,N'-diallylmelamine may be used. The amount of the nitrogen compounds to be used should be measured so that 0.6 to 1.2, preferably 0.8 to 1.0 of reactive amino hydrogens are allotted to each epoxide group of the triglycidyl isocyanurate.

Especially favorable results are obtained with the plastisols of the invention when dicyanodiamide or melamine is used as a hardening agent. In this case, 1 to 15, preferably 2 to 10 parts by weight of hardeners are allotted to each 100 parts by weight of crystalline triglycidyl isocyanurate.

The plastisols of the invention may contain additional conventional auxiliary substances such as stabilizers, fillers, dyes and the like.

As stabilizing agents are considered, for example, basic lead carbonate, basic lead sulfate, basic lead phosphate or basic lead phthalate, or epoxide stabilizers such as, for example, epoxidized soybean oil or an alkyl ester of an epoxystearic acid, such as the methyl ester. As fillers are considered for example, chalk, talcum, ground alumina, metal powder and others. Suitable dyes are, for example, titanium dioxide, carbon black, red ferric oxide, copperphthalocyanine.

As it is well known, the plastisols of the invention can be applied onto any workpiece to be coated or bonded and be caused to gel by heating to temperatures of about 120° to 180° C. In this manner, securely adhering coatings or adhesive bonds can be obtained on or between materials of the widest types, as, for example, metals, such as iron, steel, zinc, aluminum, chromium, vanadium, titanium, or alloys of the named metals or ceramics, natural stones, concrete parts, mineral fiber plates and the like.

Moreover, the plastisols of the invention can be utilized for the cementing of ceramic tiles, in particular for a point or spot adhesion. They are also suitable for the cementing of sheet metal seams, for example, in the construction of vehicle bodies, for the construction of railroad cars, for cementing metal parts of any form chosen at random, for example, in industrial construction work. Reenforcements on sheet metal, for example, in auto construction and in the production of deep-freeze devices can be easily attached. Furthermore, sheet metal plates can be coated over their entire surface and in this manner are suitable for building houses, in particular for the assembly of pre-fabricated parts.

As the coatings prepared with the plastisols of the invention show an especially satisfactory adhesion on any foundation, it is as a rule not necessary to conduct a particularly careful cleaning of such foundation. Basically, all of the materials can be coated or cemented with the plastisols of the invention, as long as they are capable of withstanding the temperatures required for the gelatinization of the plastisol.

A further advantage of the plastisols of the invention is the outstanding heat stability, exhibited by the coatings or gluings obtained with the said plastisols. For example, their heat stability is considerably greater than that of gelatinized plastisols which comprise the usual epoxide resins based on diphenylolpropane instead of the triglycidyl isocyanurate.

The following examples are illustrative of the practice of the invention. They are not, however, limitative in any respect.

Example 1

In a Z-kneading apparatus of the firm of Meili, a mixture of the following constituents was prepared:

| | Gm. |
|---|---|
| Polyvinylchloride, K-value=70 | 259 |
| Dioctyl phthalate | 388 |
| Chalk | 230 |
| Basic lead phosphite | 36 |
| Triglycidyl isocyanurate (mixture of high and low melting forms; epoxide-oxygen-content=15.4%) | 75 |
| Dicyanodiamide | 12 |

This mixture was applied on steel plates measuring 10 x 3 cm. in a layer of 2 mm., and gelatinized in a circulating-air oven at a temperature of 160° C. After the predetermined temperature of 160° C. was obtained, it required 20 minutes for the mixture to gelatinize. A rigidly adhering coating was obtained, which could be removed from the base only by fracturing the coating.

The heat stability of the coatings was tested at a temperature of 210° C. (working temperature). For this purpose, the samples, prepared as previously described, were placed in a circulating-air-oven and left therein over various periods of time. Every 10 minutes, samples were removed from the oven and stored for 72 hours at a temperature of 38° C. and 95% relative atmospheric moisture. Thereafter, it was determined when the first indications of corrosion beneath the coating became visible. In the present case, the very first signs of corrosion underneath the coating were noted on samples which had been heated longer than 90 minutes at 210° C. This time will be indicated as heat resistance at 210° C. hereinafter.

Aluminum sheets were coated with the same mixture and a rigidly adhering, smooth coating was also obtained.

In addition, iron plates measuring 100 x 25 x 0.88 mm. were cemented with this mixture in overlapping fashion (length of overlap=20 mm.). The coating thickness of the plastisol was about 0.25 mm. In each case, a good adhesion was obtained, with a shearing strength ranging between 30 to 40 kp./cm.$^2$.

In the same manner aluminum sheets of the same size were glued together. In this case the gelatinization temperature was 160° C. for 20 minutes. An average shearing strength of 41 kp./cm.$^2$ was measured on various samples.

Furthermore, by gelatinization the 160° C. working temperature over a period of 20 minutes, small mosaic stones measuring 40 x 40 x 6 mm. were glued together at the edges with the plastisol. The coating thickness measured 5 mm. On 10 samples an average tensile strength of 36 kp./cm.$^2$ was ascertained.

EXAMPLE 2

In a Z-kneading device of the firm of Meili, a mixture of the following constituents was prepared:

| | Gm. |
|---|---|
| Polyvinylchloride, K-value=70 | 240 |
| Dioctyl phthalate | 360 |
| Chalk | 213 |
| Basic lead phosphite | 33 |
| Glycidyl isocyanurate (mixture of high and low melting forms, epoxide-oxygen-content=15.4%) | 70 |
| Phthalic acid anhydride | 84 |

With the plastisol descriped above, 2 mm. coatings on iron, aluminum and zinc sheets were prepared. Gelatinization temperature was 160° C., for a time of 21 minutes. Solidly adhering coatings were obtained.

Under identical conditions, adhesive bonds were effected on ceramic tiles (40 x 40 x 5 mm.) and on iron sheets (100 x 25 x 0.88 mm.). The tensile strength or the shearing strength was measured on various glued samples:

| | Kp./cm.$^2$ |
|---|---|
| Ceramic | 37 |
| Iron | 35 |

As described in the preceding example, a heat stability of 90 minutes was ascertained with coatings on iron sheets heated at 210° C.

*Comparison test.*—In a Z-kneading device of the firm of Meili, a mixture of the following constituents was prepared:

| | Gm. |
|---|---|
| Polyvinylchloride, K-value=70 | 274 |
| Dioctyl phthalate | 354 |
| Chalk | 242 |
| Basic lead phosphite | 38 |
| Epoxide resin based on diphenylolpropane (epoxide-oxygen-content=8.6%) | 80 |
| Dicyanodiamide | 12 |

Aluminum sheets measuring 100 x 25 x 0.88 mm. were coated with this mixture and gelatinized at a temperature of 160° C. The gelatinization period required to effect an adhesion was 40 minutes. The heat stability (see Example 1) at 210° C. lasted only 20 minutes.

If in the same mixture the dicyanodiamide was substituted by 54 gm. of phthalic acid anhydride, the heat stability improved, but the minimum time for hardening at 160° C. was prolonged to 60 minutes.

EXAMPLE 3

In a mixer, the following components were admixed intimately:

| | Gm. |
|---|---|
| Polyvinylchloride (K-value 70) | 259 |
| Octadecylsulfonic acid ester of cresol | 388 |
| Chalk | 230 |
| Basic lead phosphite | 36 |
| Triglycidyl isocyanurate (15.1% epoxide-oxygen-content) | 75 |
| Dicyanodiamide | 12 |

The above mixture was applied to steel sheets of the measurement 10 x 3 cm. as well as aluminum sheets of the measurement 10 x 3 cm. and gelatinized at a temperature of 165° C. for a period of 15 minutes.

Obtained were strongly adherent coatings which could only be separated from the metals by fracturing the coatings.

EXAMPLE 4

A mixture was prepared from the following components:

| | Gm. |
|---|---|
| Polyvinylchloride (K-value 60) | 259 |
| Dioctylphthalate | 388 |
| Chalk | 230 |
| Basic lead carbonate | 36 |
| Triglycidyl isocyanurate | 25 |
| Triglycidyl isocyanurate (15.6% epoxide-oxygen-content) | 25 |
| Dicyanodiamide | 12 |

This mixture was spread thinly on iron sheets of the measurement 10 x 25 x 0.88 mm. and the sheets were placed together 2 cm. overlappingly. The layer depth of the plastisol was approximately 0.30 mm. The plastisol was gelatinized for 15 minutes at 170° C. The shearing strength of those cementings obtained was between 28 and 36 kp./cm.$^2$.

EXAMPLE 5

A mixture was prepared in accordance with Example 4. However, the polyvinylchloride was substituted by another with a K-value of 80.

Aluminum and iron sheets of the measurements 10 x 3 cm. were covered with a 0.2 mm. thick layer of plastisol and gelatinized for 15 minutes at a temperature of 165° C. Strongly adherent coatings were obtained which could not be separated from the base without fracturing.

EXAMPLE 6

Example 4 was repeated, however, the polyvinylchloride was substituted by a polymerisate mixture of the vinylchloride with 10% vinylidenechloride (K-value 65).

In accordance with the example described above aluminum, iron and stainless steel sheets were covered. The gelatinizing took place at 170° C. for a period of 15 minutes.

Obtained were strongly adherent coatings.

Example 7

A base mixture was prepared from the following components:

| | Gm. |
|---|---|
| Polyvinylchloride (K-value 70) | 259 |
| Dioctyl phthalate | 388 |
| Chalk | 230 |
| Basic lead carbonate | 12 |
| Basic lead phosphite | 42 |
| Triglycidyl isocyanurate (15.2% epoxide-oxygen-content) | 75 |

This mixture was admixed with different amounts of hardeners. In the following list the first column shows the hardener; the second column, the amount admixed of the hardener; and the last columns the time in minutes and the temperature of gelatinizing.

LIST

| Hardener | Amount, (g.) | Minutes | Temp. (° C.) |
|---|---|---|---|
| Melamine | 12 | 15 | 180 |
| Melamine | 40 | 15 | 180 |
| Pyromellitic acid dianhydride | 80 | 20 | 170 |
| Methylendomethylenetetrahydrophthalic acid anhydride | 110 | 20 | 175 |
| Carbodihydrazide | 20 | 20 | 150 |

In all cases strongly adherent, 0.25 mm. thick coatings were obtained on aluminum, stainless steel, ceramic plates and porcelain disks.

Moreover, several mosaic stones of the measurement 12 x 12 x 10 mm. were cemented with each other along the edges.

The preceding specific embodiments are illustrative of the process of the invention. It is to be understood, however, that other expedients known to those skilled in the art or disclosed herein may be employed without departing from the spirit of the invention or the scope of the appended claims.

We claim:

1. A plastisol based on polymers capable of forming a paste selected from the group consisting of polyvinylchloride and mixed polymerizates of vinyl chloride and monomers copolymerizable therewith, said plastisol having a content of from about 1% to 20% by weight based on the total amount of said plastisol of a crystalline triglycidyl isocyanurate having an epoxide oxygen content of at least 14% and an organic epoxide resin hardening agent.

2. The plastisol of claim 1 wherein said crystalline triglycidyl isocyanurate is present in an amount of from about 4% to about 12% by weight based on the total amount of said plastisol.

3. The plastisol of claim 1 wherein said organic epoxide resin hardening agent is a solid at ambient temperatures.

4. The plastisol of claim 3 wherein said organic epoxide resin hardening agent, solid at ambient temperature is an organic polycarboxylic acid anhydride.

5. The plastisol of claim 3 wherein said organic epoxide resin hardening agent, solid at ambient temperature is dicyandiamide.

6. The plastisol of claim 3 wherein said organic epoxide resin hardening agent, solid at ambient temperature is melamine.

References Cited

UNITED STATES PATENTS 3,404,196 12/1966 Weinrich _____ 260—830
3,351,673 8/1965 Price _____ 260—830

PAUL LIEBERMAN, Primary Examiner

U.S. Cl. X.R.

117—126, 132, 123, 121; 161—184, 186; 260—318, 308, 306, 784, 45.75, 823, 41